(12) United States Patent
Bartholomew et al.

(10) Patent No.: US 10,097,430 B2
(45) Date of Patent: Oct. 9, 2018

(54) TRACKING AND ANALYZING MOBILE APPLICATION USER INTERACTIONS

(71) Applicant: Walmart Apollo, LLC, Bentonville, AR (US)

(72) Inventors: Aaron Robert Bartholomew, Noel, MO (US); William Hogg, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 181 days.

(21) Appl. No.: 15/053,780

(22) Filed: Feb. 25, 2016

(65) Prior Publication Data

US 2016/0254970 A1 Sep. 1, 2016

Related U.S. Application Data

(60) Provisional application No. 62/126,361, filed on Feb. 27, 2015.

(51) Int. Cl.
| | |
|---|---|
| *G06F 15/16* | (2006.01) |
| *H04L 12/26* | (2006.01) |
| *H04W 24/08* | (2009.01) |
| *G06Q 30/02* | (2012.01) |
| *H04L 12/24* | (2006.01) |
| *H04L 29/08* | (2006.01) |
| *H04M 1/725* | (2006.01) |

(52) U.S. Cl.
CPC .......... *H04L 43/065* (2013.01); *G06Q 30/02* (2013.01); *H04L 41/5067* (2013.01); *H04L 67/22* (2013.01); *H04W 24/08* (2013.01); *H04L 43/08* (2013.01); *H04M 1/72522* (2013.01)

(58) Field of Classification Search
CPC .......... G06C 30/02; H04L 67/22; H04L 43/08
See application file for complete search history.

(56) References Cited

U.S. PATENT DOCUMENTS

| | | | |
|---|---|---|---|
| 8,489,081 B2 | 7/2013 | Marshall | |
| 8,856,748 B1 | 10/2014 | Larsen | |
| 8,863,086 B2 | 10/2014 | Chang | |
| 2008/0274716 A1 | 11/2008 | Fok | |
| 2011/0307320 A1* | 12/2011 | Tangney | ................ G06Q 30/02 705/14.41 |

(Continued)

FOREIGN PATENT DOCUMENTS

WO WO 2013093011 6/2013

OTHER PUBLICATIONS

Thomas, Drew, *How to Simply Mobile App Data with Google Analytics and Tag Manager*, Published on Dec. 9, 2013, 14 pages.

(Continued)

*Primary Examiner* — Padma Mundur
(74) *Attorney, Agent, or Firm* — Patterson Thuente Pedersen, P.A.

(57) ABSTRACT

The present disclosure extends to methods, systems, and computer program products for tracking and analyzing mobile application user interactions. One or more mobile devices run an application. At each of the one or more mobile devices, a framework level interaction logger logs user interactions with the application. Analysis modules and heat map generators can use the logged user interactions to generate reports and heat maps indicative of the performance of the application.

5 Claims, 13 Drawing Sheets

(56) References Cited

U.S. PATENT DOCUMENTS

| | | | |
|---|---|---|---|
| 2013/0103740 A1* | 4/2013 | Tully | H04N 21/251 |
| | | | 709/203 |
| 2013/0346599 A1 | 12/2013 | Wilson | |
| 2014/0019228 A1 | 1/2014 | Aggarwal | |
| 2014/0019461 A1* | 1/2014 | Bredenberg | G06Q 30/02 |
| | | | 707/754 |
| 2014/0032656 A1 | 1/2014 | Hyman | |
| 2014/0068498 A1* | 3/2014 | Olsen | G06F 11/32 |
| | | | 715/781 |
| 2014/0150100 A1 | 5/2014 | Gupta | |
| 2014/0279846 A1* | 9/2014 | Srinivasan | G06F 17/30011 |
| | | | 707/608 |
| 2014/0280517 A1 | 9/2014 | White | |
| 2015/0341232 A1* | 11/2015 | Hofleitner | H04L 67/306 |
| | | | 709/224 |

OTHER PUBLICATIONS

Windows Apps Team, Instrumenting Your App for Telemetry and Analytics, Mar. 20, 2014, 11 pages.

Xamarin, Publishing to the App Store, *A Guide to Distributing Xamarin.iOS Applications*, 23 pages, Date Unknown.

* cited by examiner

TRACKING AND ANALYZING MOBILE APPLICATION USER INTERACTIONS

CROSS-REFERENCE TO RELATED APPLICATIONS

This application claims the benefit of U.S. Provisional Patent Application Ser. No. 62/126,361, filed Feb. 27, 2015, and titled "Tracking and Analyzing Mobile Application User Interactions," the entire contents of which are incorporated by reference herein.

BACKGROUND

1. Field of the Invention

This invention relates generally to the field of analyzing user interactions with mobile applications and more specifically to tracking and analyzing user interactions with mobile applications.

2. Related Art

In general, user interactions with applications can be analyzed to gauge application performance. Application analysis can lead to user experience design changes, content correction, and other application improvements. For example, when content in an application is not often used, user experience engineers can work with users to discover what would improve the application. Analysis also allows developers to write applications that are easier to use and that can improve over time.

Mobile devices and applications vary significantly and can be used either online or offline. Mobile applications can run on a wide variety of mobile devices having different modalities and connections. Due to these differences, analyzing mobile applications can be more complex than analyzing other types of applications.

Further mobile applications are typically monitored and/or analyzed using page or site level mechanisms. Page or site level mechanisms may fail to collect more granular per element user interactions, such as, scroll up/scroll down, data field selection, etc. Page or site level mechanisms may also require creation and recreation of frameworks to analyze user behavior. However, due to limited resources in mobile devices, framework creation at a mobile device may burden available resources to the detriment of other mobile device functionality. Additionally, mobile devices may lack sufficient resources to store useful amounts of collected user interaction data and/or may not always have an available or cost effective network connection for transferring collected user interaction data to other systems for analysis. For example, when connected to a cellular network, a user may prefer not to transfer collected user interaction data that would count against their cellular provider's data plan.

In some environments, user interaction data for an application is collected at one or more devices running the application. The collected user interaction information is sent from each device to a central location, such as an analysis server. However, collecting interaction data at a page or site level limits the observable level of detail for user interactions. Limits in the detail of collected interaction data in turn limit the analysis that can be performed to identify possible user interaction improvements. For example, touch type, manual typing, and voice-entered text each provide a different user experience but entering text may be collected the same way for all modalities. Thus, differences between touch type, manual typing, and voice-entered text may not be distinguishable.

Some collection mechanisms also require altering source code to enable collections. For example, collection mechanisms can require adding one or more java script tags (<script> and </script>) to specific locations in each and every page of a website or similar information to each section of a mobile application where user interaction data is to be collected.

BRIEF DESCRIPTION OF THE DRAWINGS

The specific features, aspects and advantages of the present invention will become better understood with regard to the following description and accompanying drawings.

DETAILED DESCRIPTION

Figure 1:
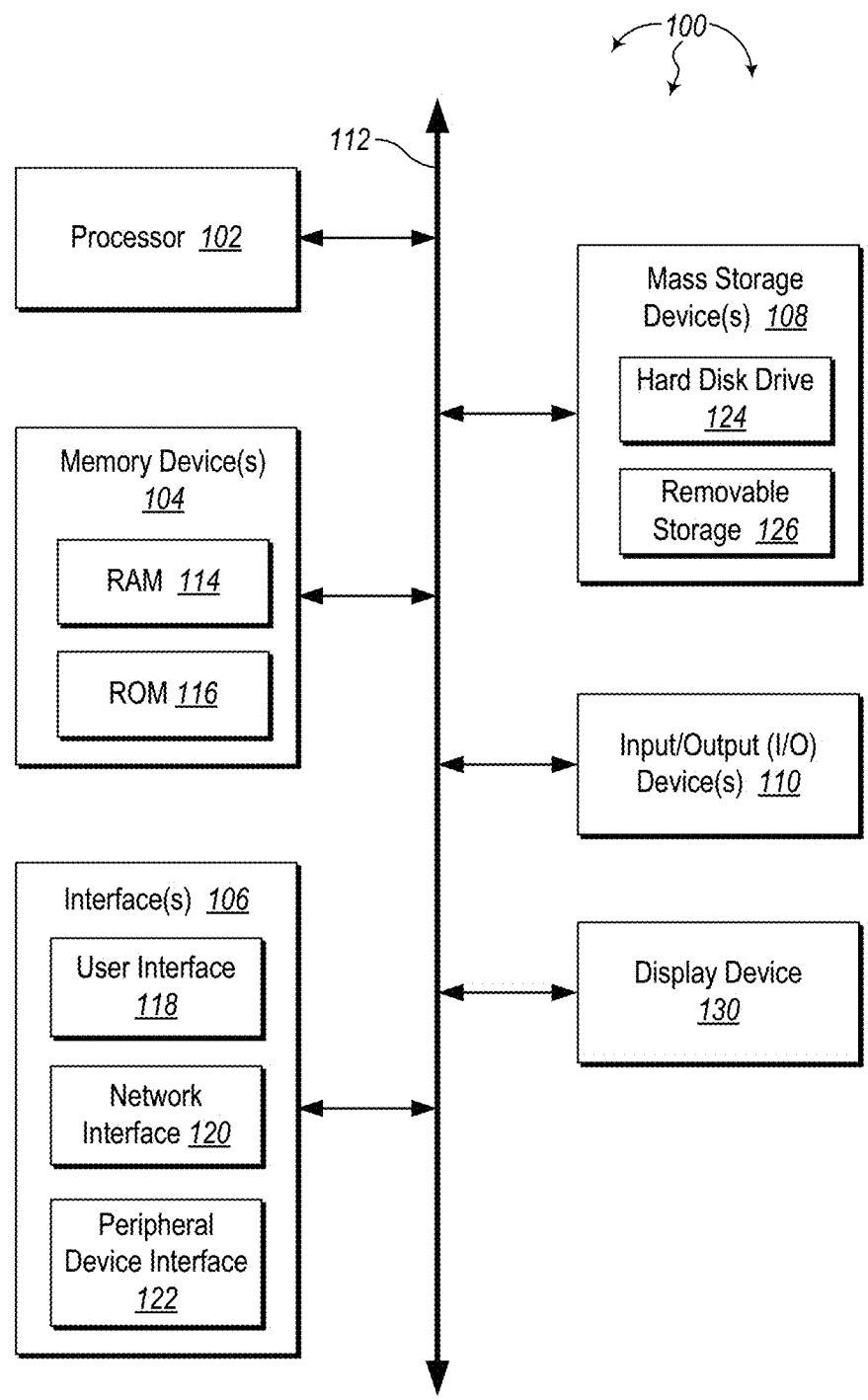
FIG. 1 illustrates an example block diagram of a computing device.

The present invention extends to systems, methods, and computer program products for tracking and analyzing mobile application user interactions. One or more mobile devices run an application. At each of the one or more mobile devices, a framework level interaction logger logs user interactions with the application. The interaction logger accesses logging configuration options. The logging configuration options define data elements for which values are to be gathered during operation of the application at the mobile device. The defined data elements can include: user interactions with the plurality of application elements of the application on a per interaction and per element basis, connection information, and device information. The connection information relates to characteristics of a network connection used by the application. The device data relates to characteristics of the mobile device.

During operation of the application at the mobile device, the interaction logger gathers values for the defined data elements at the mobile device. The application uses a cellular communication module for network communication. The gathered values are stored in an offline storage device at the mobile device. In accordance with transmission conditions and when network connectivity is available through a Wi-Fi communication module, at least some of the gathered values are sent to a network storage location through the Wi-Fi communication module.

Alternately, when a specified time limit is exceeded since gathered values were last sent, gathered values can be sent by any available communication mechanism. Thus, if a user stays on a cell network for a specified amount of time without connecting to other wireless networks, gathered values can be sent over the cell network.

User interaction data stored at the network storage location can be leveraged to provide reports and visualizations of the application's performance. A selection of data elements that are to be analyzed or that are to be presented in a heat map is received. The values for the data elements are accessed from the network storage location.

The performance of the application can be determined by analyzing the accessed values, including analyzing values for user interactions with a plurality of application elements of the application in a per interaction and per element basis. Analyzing accessed values can include grouping accessed values into user-specific groupings, separating the user-specific groupings by occurrence, and segmenting the values by application and occurrence. A report indicative of the determined application performance can be returned.

Alternately, a heat map can be formed for the application by representing user interactions as a heat map overlay of the application based on the accessed values. The heat map can vary the visual representation of each user interaction based on one or more of: values for the user interaction, connection information, and device information. Generating a heat map can include displaying an application view as it appeared to a user at the time the interaction took place and overlaying the interaction at the points of interaction within the application view.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, watchers, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

It is further noted that, where feasible, functions described herein can be performed in one or more of: hardware, software, firmware, digital components, or analog components. For example, one or more application specific integrated circuits ("ASICs") can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

In general, aspects of the invention are directed to tracking and analyzing mobile (and possibly Web-based) application user interactions. Mobile devices running a mobile application can gather and store values for data elements of the mobile application. During application operation and gathering of values, network connectivity may be provided by a less preferred (e.g., lower bandwidth and/or potentially more costly) connection, such as a cellular connection. Transmission conditions can define when gathered values are to be sent a network storage location. Transmission conditions can include a time period and/or collection of a specified amount of values. In accordance with the transmission conditions and when network connectivity is available by a more preferred (e.g., higher bandwidth and/or potentially less costly) connection, such as a Wi-Fi connection (i.e., a communication based on IEEE 802.11 standards), values can be sent to network storage. Sending values when a more preferred connection is available promotes more efficient and less costly transfer of data.

In some aspects, gathered values are reconfigured in storage to reduce the storage footprint of gathered values. Gathered values can be reconfigured by changing how duplicate values for data elements are represented. For example, if a value for a data element is gathered seven times, the representation of the value can be changed such that the value is stored once along with an annotation that the value occurred seven times. Reconfiguring the representation of gathered values conserves storage resources and can permit a mobile device to go longer periods of time between sending values to a network storage location.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130, all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various hardware storage devices, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
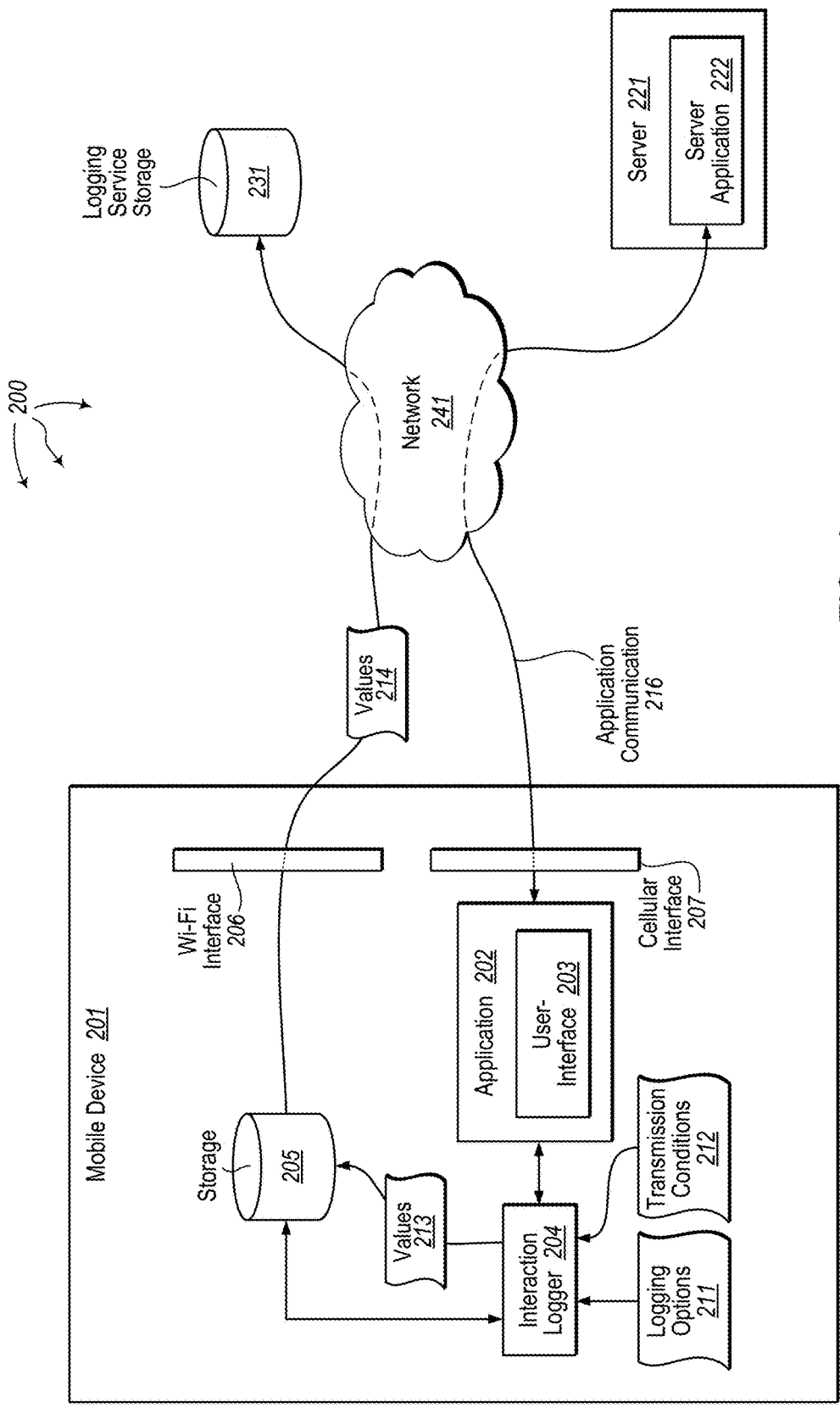
FIG. 2 illustrates an example computer architecture that facilitates delivering user interaction data for an application.

FIG. 2 illustrates an example computer architecture 200 that facilitates delivering user interaction data for an application. As depicted, computer architecture 200 includes mobile device 201, server 221, and logging service storage 231. Mobile device 201, server 221, and logging service storage 231 are connected via network 241. Network 241 can comprise a local area network (LAN), a wide area network (WAN), or any other type of communication network. In one exemplary embodiment, network 241 comprises the Internet, and messages are communicated across network 241 using transmission control protocol/Internet protocol (TCP/IP). However, other types of networks and other types of protocols can be used.

Mobile device 201 further includes application 202 (e.g., a mobile application or a web-based application), interaction logger 204, storage 205, Wi-Fi interface 206, and cellular interface 207.

Interaction logger 204 is configured to gather values for data elements defined in logging options 211 from application 202 during the operation of application 202. Interaction logger 204 can store gathered values in storage 205.

Application 202 can be virtually any application, such as, for example, a mapping application, an e-commerce application, a social media application, a messaging application, etc. During operation, application 202 can be part of a distributed application that interoperates with server application 222 at server 221. When Wi-Fi interface 206 indicates Wi-Fi connectivity, application 202 can exchange application communication with server application 222 via Wi-Fi interface 206. On the other hand, when Wi-Fi connectivity is not available, application 202 can exchange application communication 216 with server application 222 via cellular interface 207.

Application 202 includes user interface 203. A user of mobile device 201 can interact with application 202 through user interface 203 to enter commands, view output, etc. A user can use an input devices (e.g., keyboard) and/or body parts (e.g., fingertip) to enter data at user-interface 203. Interaction logger 204 can gather and store values related to entry of data though user interface 203. For example, interaction logger 204 can detect interaction with data elements represented by and/or through user interface 203. Date elements can include user interface elements presented in user interface 203, such as, for example, click boxes, data fields, drop down menus, radio buttons, etc.

In accordance with transmission conditions 212, interaction logger 204 can control when stored values are sent to logging service storage 231. For example, transmission conditions 212 can indicate that stored values are to be sent from storage 205 when one or more of: when Wi-Fi connectivity is available, when specified time intervals occur, or when a specified amount of values are stored in storage 205. Logging service storage 231 is configured to receive and store values gathered by interaction loggers at mobile devices.

Figure 3:
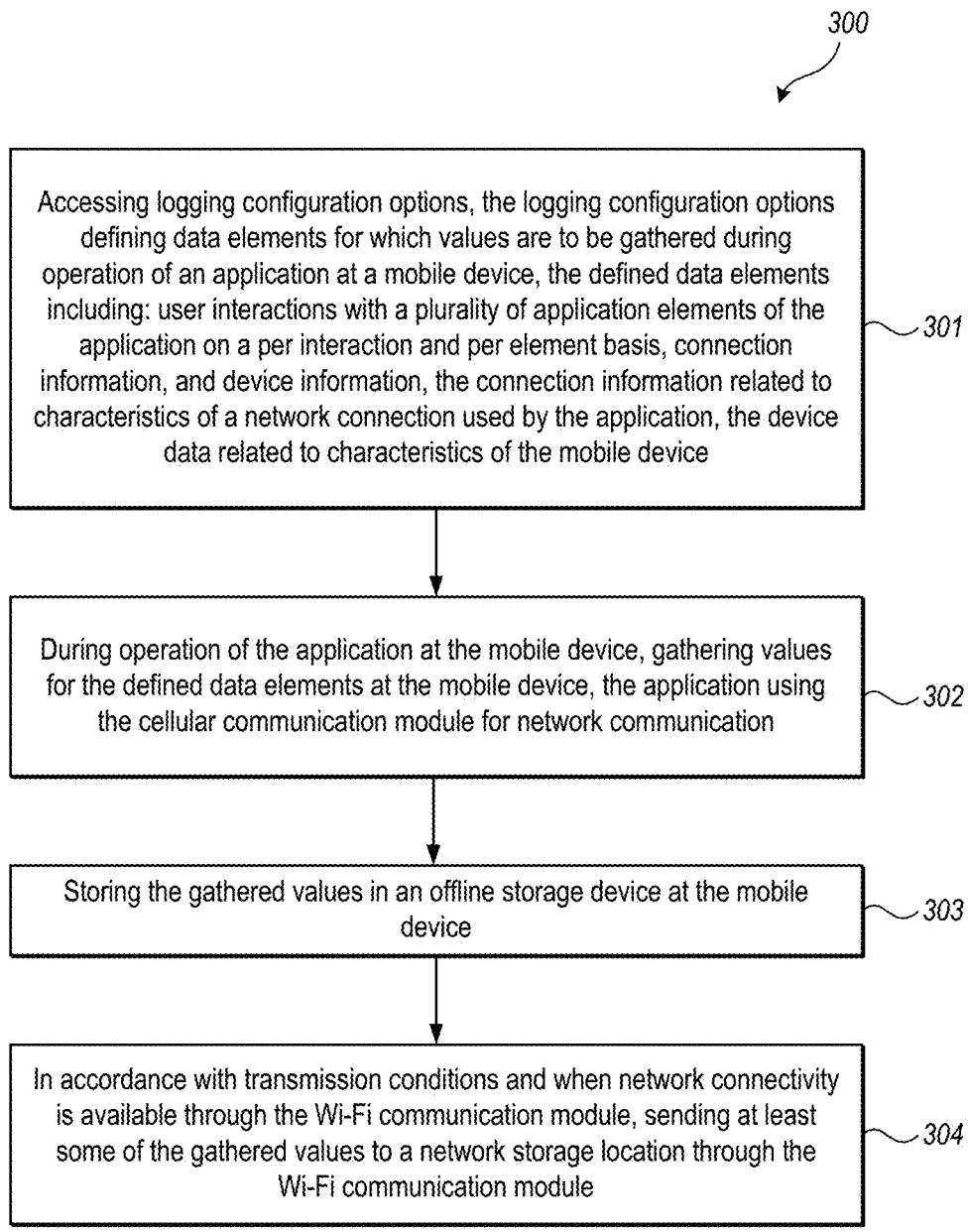
FIG. 3 illustrates an example method for delivering user interaction data for an application.

FIG. 3 illustrates a flow chart 300 of an exemplary method 300 for delivering user interaction data for an application. The method 300 will be described with respect to the data and modules in computer architecture 200.

A user of mobile device 201 can enter input into mobile device 201 to activate application 202. When activated, application 202 can present user interface 203 on a display device at mobile device 201.

Method 300 includes accessing logging configuration options, the logging configuration options defining data elements for which values are to be gathered during operation of the application at the mobile device, the defined data elements including: user interactions with the plurality of application elements of the application on a per interaction and per element basis, connection information, and device information, the connection information related to characteristics of a network connection used by the application, the device data related to characteristics of the mobile device (301). For example, upon detecting that application 202 has been activated, interaction logger 204 can access logging configuration options 211. Logging configuration options 211 can define data elements for which values are to be gathered from application 202. Defined data elements can include: user interactions with (e.g., user interface) elements of application 202 on per interaction and per element basis, connection information related to characteristics of a network connection via cellular interface 207, and device information related to characteristics of mobile device 201.

Method 300 includes, during operation of the application at the mobile device, gathering values for the defined data elements at the mobile device, the application using the cellular communication module for network communication (302). For example, as application 202 operates, interaction logger 204 can gather values 213 for the defined data elements at mobile device 201. During operation of application 202, application 202 and server application 222 can exchange application communication 216 via cellular interface 207.

Any of the following types of data can be gathered per interaction:

Level: logging level to use
UserId: user-specific identifier
deviceId: device-specific identifier
deviceType: type of device (e.g., iPad 2)
appId: application specific identifier
screen: reference for which part of the application a user is accessing (e.g., login, cart, checkout, etc.)
targetType: type of element that was the interaction target (e.g., text area, select (drop down), radio, date time selector, etc.)
targetOffsetLeft: offset of the target element from left of screen
targetOffsetTop: offset of the target element from top of screen
targetId: unique identifier for the target element
pageId: identifier for multi-page applications
StateId: identifier for applications that use state change charts
eventType: type of interaction event (click, text entry, long click, double click, etc.)
eventTime: time (e.g., down to millisecond) at which interaction occurred
contentArea: area in which interaction occurred
contentId: id for the content area
userAgent: if application is a browser-based app, the browser type that the browser self-reports.
value: value of target element (encrypted if present before logging)
xPos: overall horizontal position of the interaction
yPos: overall vertical position of the interaction
interactionType: similar to event type, can be a sub-type of eventType based on targetType and interaction modality
interactionModality: modality of interaction (voice, manual, touch, visual interaction, etc.)
site: if application is a browser-based, the parent site/domain of the application
totalWidth: total display width
totalHeight: total display height
uxSession: unique identifier (not a site session Id) for the interaction logger
targetWidth: width of target element
targetHeight: height of target element
connection name: name of connection used at time of interaction
connection type: type of connection used at time of interaction (e.g., 3g, 4g, wireless, offline, etc.)
connection speed: speed of connection used at time of interaction. Can be a numerical representation (e.g., kbps) or a rating, such as, for example, excellent, good, poor, none, etc.
target/widget identifier: identifier of a target or widget
target/widget type: link, calendar, textbox, input, etc.
timestamp: can be derived from eventTime
% y of interaction: can be derived form yPos
% x of interaction: can be derived from xPos
duration: duration of service call
screen resolution: pixel width by pixel height of screen (can be derived from total Width and totalHeight)
screen orientation: portrait or landscape
sequence: calculated on the analytics engine, rather than during interactions
start time: time that the service call started
end time: time that the service call completed
url: endpoint for the service call status code: status returned from the service call
response: response from the service call (encrypted before logging)
Response size: size of the service call response A change in interaction modality in application 202 (touch typing to manual typing, manual typing to voice, etc.) can modify the interaction modality logged. A return to another modality can again modify the interaction type logged.

Method 300 includes storing the gathered values in an offline storage device at the mobile device (303). For example, interaction logger 204 can store values 213 in storage 205. As described, values 213 are kept in storage 205 until transmission conditions 212 are met.

Further, the contents of storage 205 can be filtered or purged based on configurable rules. As described, filtering or purging can include reconfiguring the representation of duplicated gathered values.

Method 300 includes, in accordance with transmission conditions, and when network connectivity is available through the Wi-Fi communication module, sending at least some of the gathered values to a network storage location through the Wi-Fi communication module (304). For example, when transmission conditions 212 are satisfied and when network connectivity is available through Wi-Fi interface 206, interaction logger 204 can cause values 214 to be sent through Wi-Fi interface 206 to logging service storage 231. Values 214 can include some or all of the values 213.

Logging and reporting are dynamically configurable so that each application, page and state can be enabled or disabled based on: device considerations (e.g., available storage space in storage 205), application considerations (performance, application enabled for tracking, etc.), and business rules.

Generally, functionality similar to that of mobile device 201 can be implemented at one or more other mobile devices running application 202. Values can be gathered at the one or more other mobile devices and eventually sent to logging service storage 203. The application can then be analyzed for user interactions. User interactions include what the users are doing (or not doing). Different versions of proof of concept applications can be sent out to see which version is preferred, or is more useable, etc.

Figure 4:
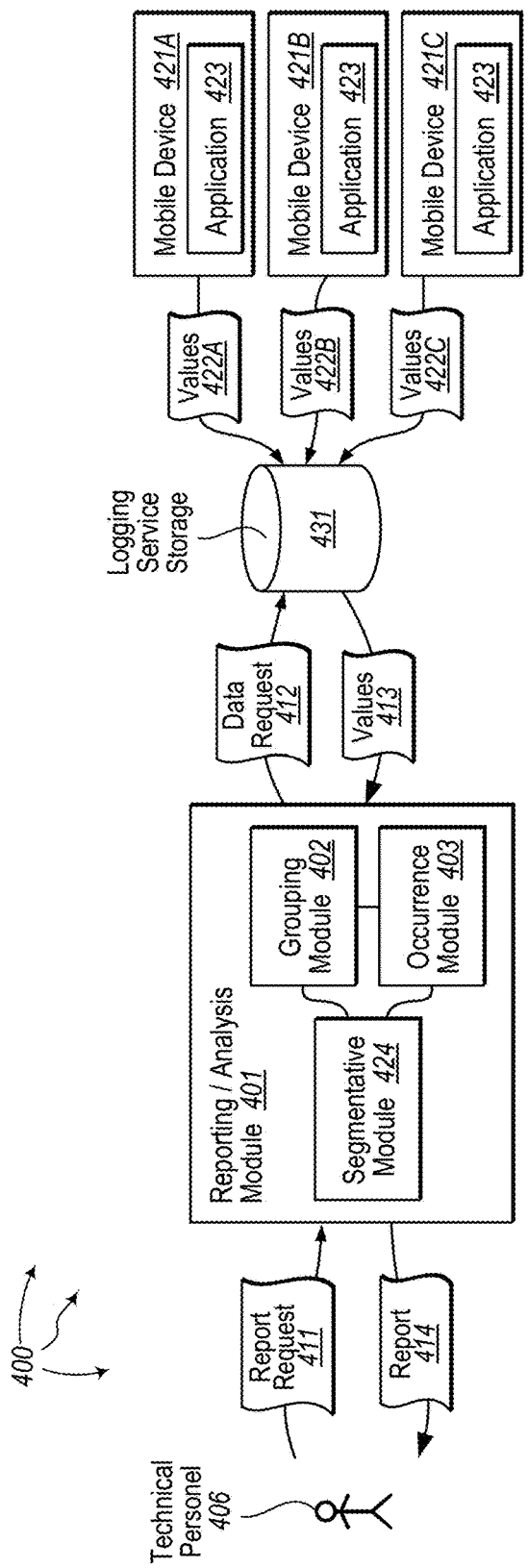
FIG. 4 illustrates an example computer architecture that facilitates analyzing performance of an application.

FIG. 4 illustrates an example computer architecture 400 that facilitates analyzing performance of an application. As depicted, computer architecture 400 includes reporting/analysis engine 401, logging service storage 431, and mobile devices 421A, 421B, and 421C. Reporting/analysis engine 401, logging service storage 431, and mobile devices 421A, 421B, and 421C can be connected via a network. The network can comprise a local area network (LAN), a wide area network (WAN), or any other type of communication network. In one exemplary embodiment, the network comprises the Internet, and messages are communicated across the network using transmission control protocol/Internet protocol (TCP/IP). However, other types of networks and other types of protocols can be used.

Each of mobile devices 421A, 421B, and 421C is includes application 423 (e.g., a mobile application or a web-based application) that can be run from time to time. An interaction logger at each of mobile devices 421A, 421B, and 421C can gather values during operation of application 423. Gathered values 422A, 422B, and 422C can be sent from mobile devices 421A, 421B, and 421C, respectively, to logging service storage 431. In one aspect, gathered values 422A 422B, and 422C are sent when transmission conditions permit.

In general, reporting/analytics engine 401 is configured to access values from logging service 431 and generate a report indicative of the performance of an application from the accessed values. As depicted, reporting/analytics engine 401 further includes grouping module 402, occurrence module 403, and segmentation module 404. Grouping module 402 is configured to break accessed values into user-specific groups. Occurrence module is configured to break down user-specific groupings by occurrence. Segmentation module 404 is configured to segment the values by application (e.g., instance) and occurrence.

Figure 5:
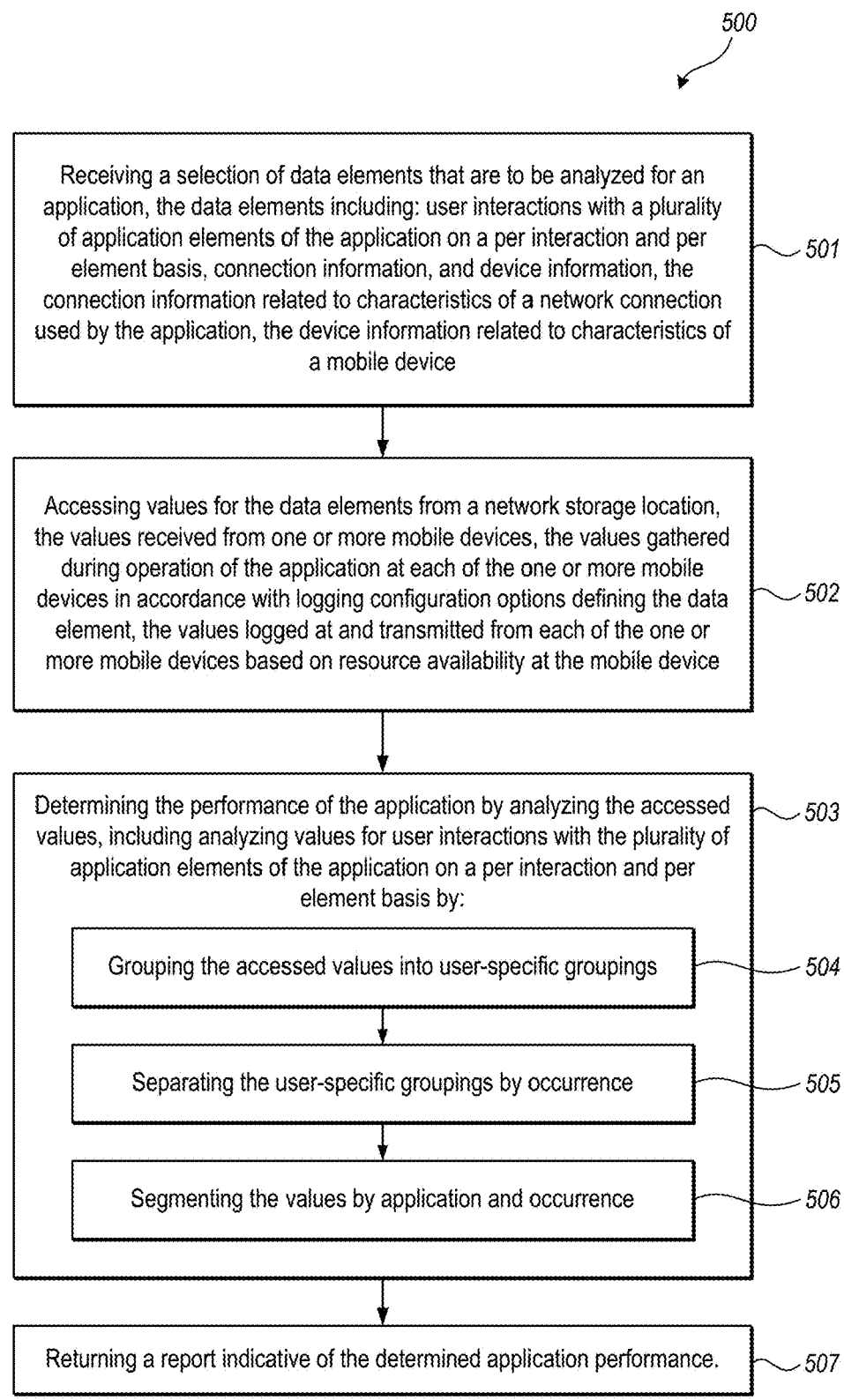
FIG. 5 illustrates an example method for analyzing performance of an application.

FIG. 5 illustrates an example method 500 for analyzing performance of an application. The method 500 will be described with respect to the data and modules in computer architecture 400.

Method 500 includes receiving a selection of data elements that are to be analyzed for the application, the data elements including: user interactions with a plurality of application elements of the application on a per interaction and per element basis, connection information, and device information, the connection information related to characteristics of a network connection used by the application, the device information related to characteristics of a mobile device (501). For example, reporting/analytics engine 401 can receive report request 411 from technical personal 406 (e.g., a user experience engineer). Report request 411 can identify data elements including user interactions with application elements of application 423 on a per interaction and per element basis, connection information related to network connections used by application 423, and device information related to mobile devices 421A, 421B, and 421C.

Method 500 includes accessing values for the data elements from a network storage location, the values received from one or more mobile devices, the values gathered during operation of the application at each of the one or more mobile devices in accordance with logging configuration options defining the data elements, the values logged at and transmitted from each of the one or more mobile devices based on resource availability at the mobile device (502). For example, reporting/analytics engine 401 can access values 413 from logging service storage 431. Reporting/analytics engine 401 can forward data request 412 to logging service storage 431 to retrieve values 413. Values 413 are values for the data elements identified in report request 411. Values 413 can be a subset of values 422A, 422B, and 422C.

Method 500 includes determining the performance of the application by analyzing the accessed values, including analyzing values for user interactions with the plurality of application elements of the application on a per interaction and per element basis (503). For example, reporting/analytics engine 401 can determine the performance of application 423 by analyzing values 413. The analysis can include analyzing values for user interactions with elements of application 423 on a per interaction and per element basis Performance of the application can be determined by breaking the accessed values into user-specific groupings (504). For example, grouping module 402 can group values 413 into user-specific groupings. Performance of the application can be determined by separating the user-specific groupings by occurrence (505). For example, occurrence module 402 can separate the user-specific groupings from grouping module 402 by occurrence. Performance of the application can be determined by segmenting the values by application and occurrence (505). For example, segmentation module can segment the values 413 by application (e.g., instance or by application at each of devices 431A, 421B, and 421C) and by the occurrences from occurrence module 403.

Method 500 includes returning a report indicative of the determined application performance (507). For example, reporting/analytics engine 401 can return report 414 to technical personnel 406. Report 414 can include data, statistics, diagrams, etc. reflecting the performance of application 423. Technical personnel 406 can use report 414 to identify ways the performance of application 423 can be improved. Due to the granularity of values 413, report 414 can enable technical personnel 406 to identify possible improvements that might not otherwise be identified from reports based on less granular data.

Figure 6:
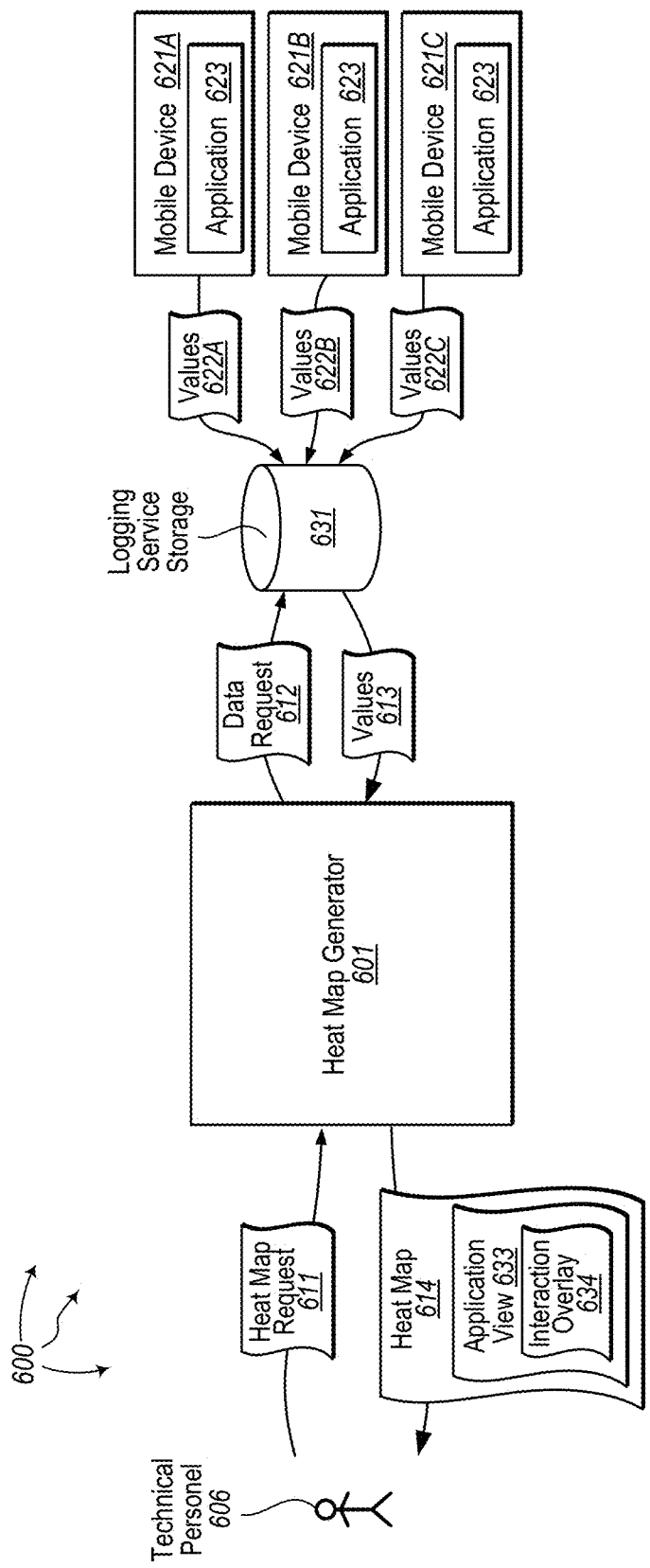
FIG. 6 illustrates an example computer architecture that facilitates presenting a visual representation of user interactions with an application.

Values from one or more mobile devices can also be used to present a heat map for an application. FIG. 6 illustrates an example computer architecture 600 that facilitates presenting a visual representation of user interactions with an application. As depicted, computer architecture 600 includes heat map generator 601, logging service storage 631, and mobile devices 621A, 621B, and 621C. Heat map generator 601, logging service storage 631, and mobile devices 621A, 621B, and 621C can be connected via a network. The network can comprise a local area network (LAN), a wide area network (WAN), or any other type of communication network. In one exemplary embodiment, the network comprises the Internet, and messages are communicated across the network using transmission control protocol/Internet protocol (TCP/IP). However, other types of networks and other types of protocols can be used.

Each of mobile devices 621A, 621B, and 621C includes application 623 (e.g., a mobile application or a web-based application) that can be run from time to time. An interaction logger at each of mobile devices 621A, 621B, and 621C can gather values during operation of application 623. Gathered values 622A, 622B, and 622C can be sent from mobile devices 621A, 621B, and 621C respectively to logging service storage 431. In one aspect, gathered values 622A, 622B, and 622C are sent when transmission conditions permit.

In general, heat map generator 601 is configured to access values from logging service 631 and generate a heat map for an application from the accessed values.

Figure 7:
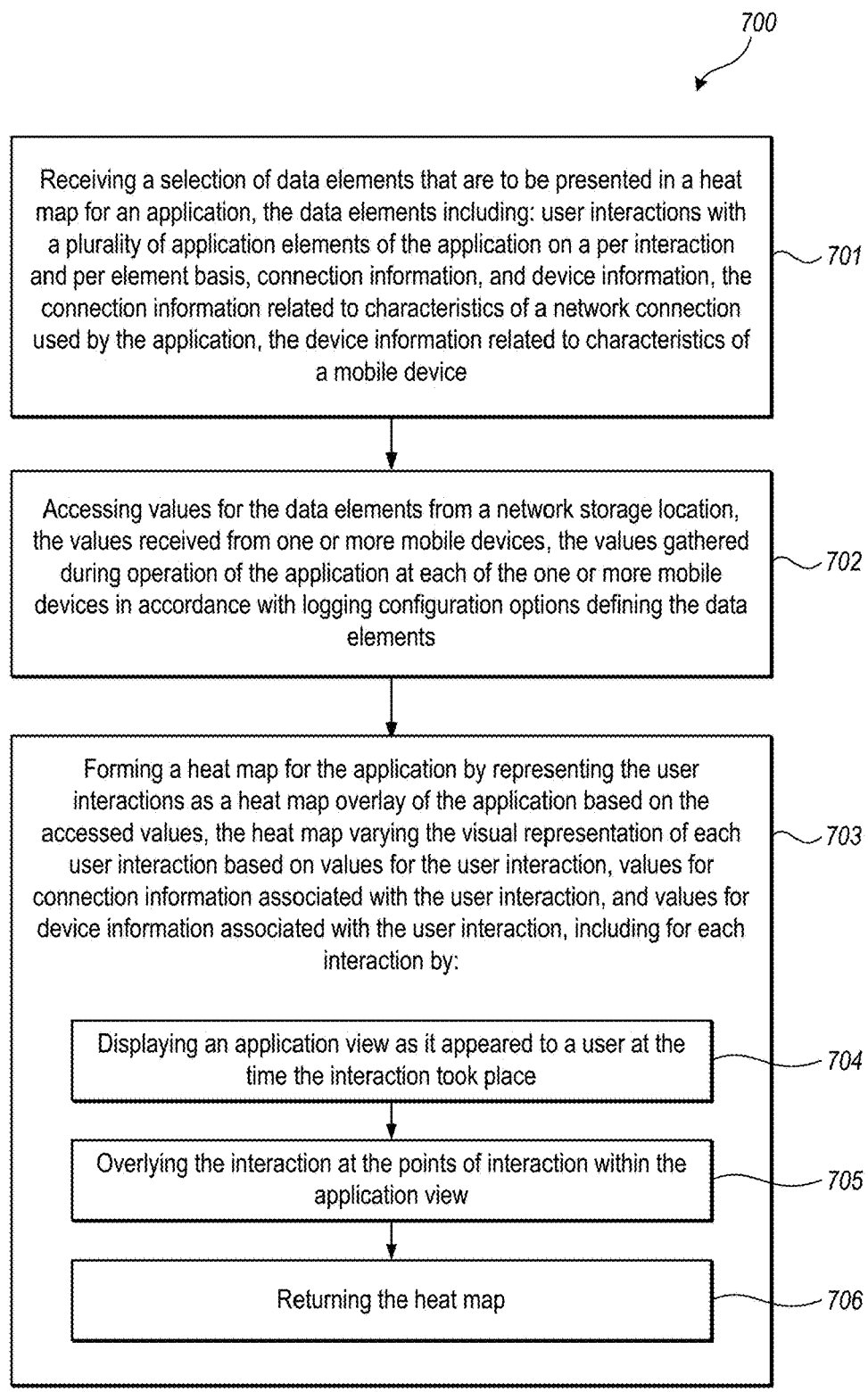
FIG. 7 illustrates an example method for presenting a visual representation of user interactions with an application.

FIG. 7 illustrates an example method 700 for presenting a visual representation of user interactions with an application. The method 700 will be described with respect to the data and modules in computer architecture 600.

Method 700 includes receiving a selection of data elements that are to be presented in a heat map for the application, the data elements including: user interactions with a plurality of application elements of the application on a per interaction and per element basis, connection information, and device information, the connection information related to characteristics of a network connection used by the application, the device information related to characteristics of a mobile device (701). For example, heat map generator 601 can receive heat map request 611 from technical personal 606 (e.g., a user experience engineer). Heat map request 611 can identify data elements including user interactions with application elements of application 623 on a per interaction and per element basis, connection information related to network connections used by application 623, and device information related to mobile devices 621A, 621B, and 621C.

Method 700 includes accessing values for the data elements from a network storage location, the values received from one or more mobile devices, the values gathered during operation of the application at each of the one or more mobile devices in accordance with logging configuration options defining the data elements (702). For example, heat map generator 601 can access values 613 from logging service storage 631. Heat map generator 601 can forward data request 612 to logging service storage 631 to retrieve values 613. Values 613 are values for the data elements identified in heat map request 611. Values 613 can be a subset of values 622A, 622B, and 622C.

Method 700 includes forming a heat map for the application by representing the user interactions as a heat map overlay of the application based on the accessed values, the heat map varying the visual representation of each user interaction based on values for the user interaction, values for connection information associated with the user interaction, and values for device information associated with the user interaction (703). For example, heat map generator 601 can form heat map 614 for application 623. Heat map generator 601 can represent user interactions as interaction overlay 634 on application view 633 based on values 613. Within heat map 601 visual representations of interactions with application 623 can be varied based on values for the user interaction, values for connection information, and values for device information.

Method 700 includes, for each interaction, displaying an application view as it appeared to a user at the time the interaction took place (704). For example, heat map 614 can display application view 633. Application view 633 can be a representation of a view that appeared to a user of a mobile device when interacting with application 623. Method 700 includes for each interaction, overlaying the interaction at the points of interaction within the application view (705). For example, interaction overlay 634 can indicate points of user interaction with application view 633 (and thus represent where a user interacted with application 623).

Method 700 includes returning the heat map (706). For example, heat map generator 601 can return heat map 614 to technical personnel 606. Technical personnel 606 can use heat map 614 to identify ways the performance of application 623 can be improved. Due to the granularity of the visualizations presented in heat map 614 (i.e., per interaction and per element), heat map 614 can enable technical personnel 606 to identify possible improvements that might not otherwise be identified from reports based on less granular visualizations.

Figure 8A:
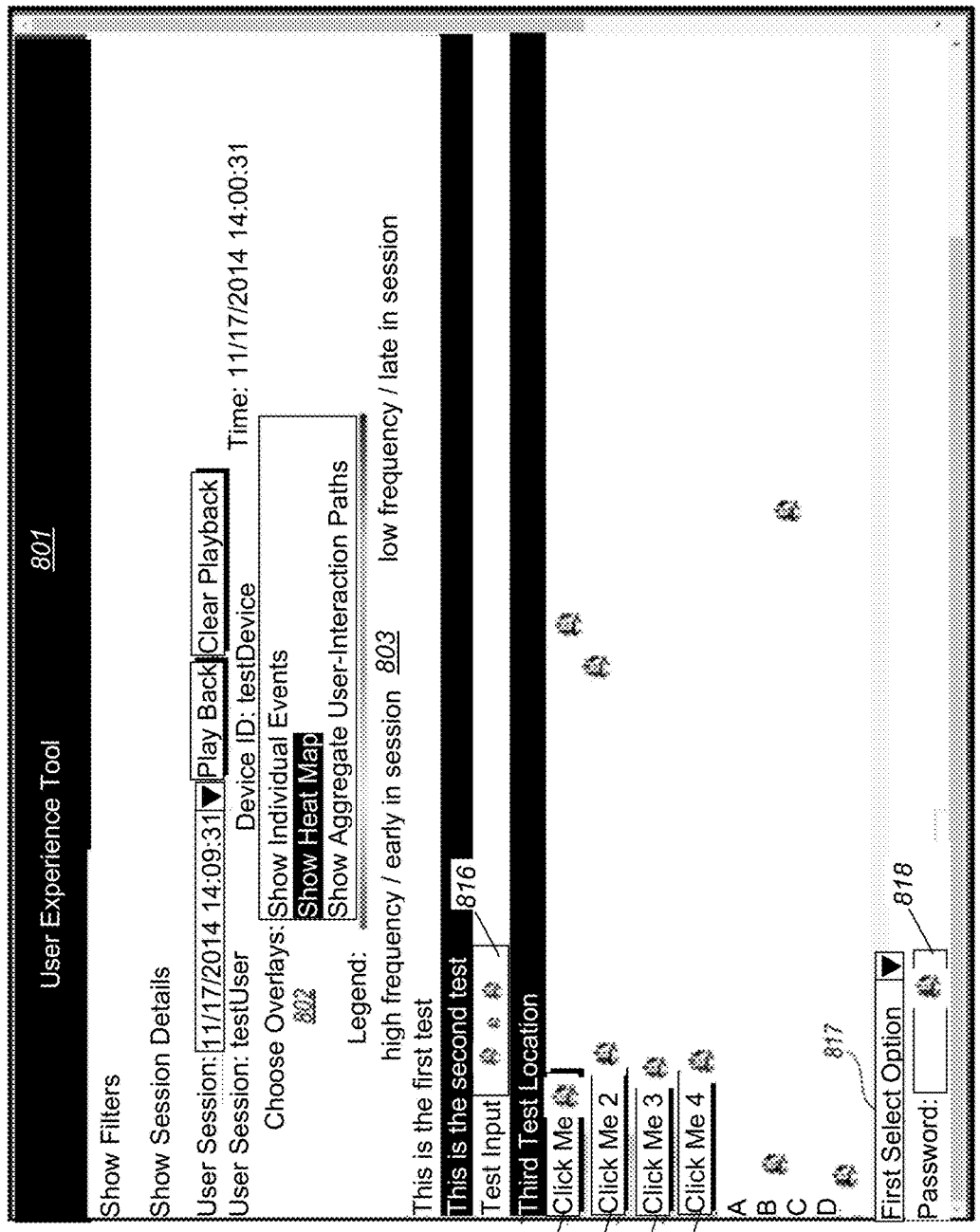
FIGS. 8A-8E illustrate different visualizations of collected user interaction data for an application.

FIGS. 8A-8E illustrate different visualizations of collected user interaction data for an application. FIG. 8A depicts user experience tool 801. Within user experience tool 801, a user (e.g., technical personnel) can choose overlays 802 to be overlaid on an application view, including showing individual events, showing a heat map, and showing aggregate user interaction paths. In FIG. 8A, "Show Heat Map" is selected. Legend 803 indicates a range of colors used to differentiate high frequency/early session interactions from low frequency/late session user interactions. An application view depicts elements of an application including input fields 816 and 818, drop down menu 817, and click boxes 811, 812, 813, and 814. The smudges indicate interaction locations with input fields 816 and 818, drop down menu 817, and click boxes 811, 812, 813, and 814.

Figure 8B:
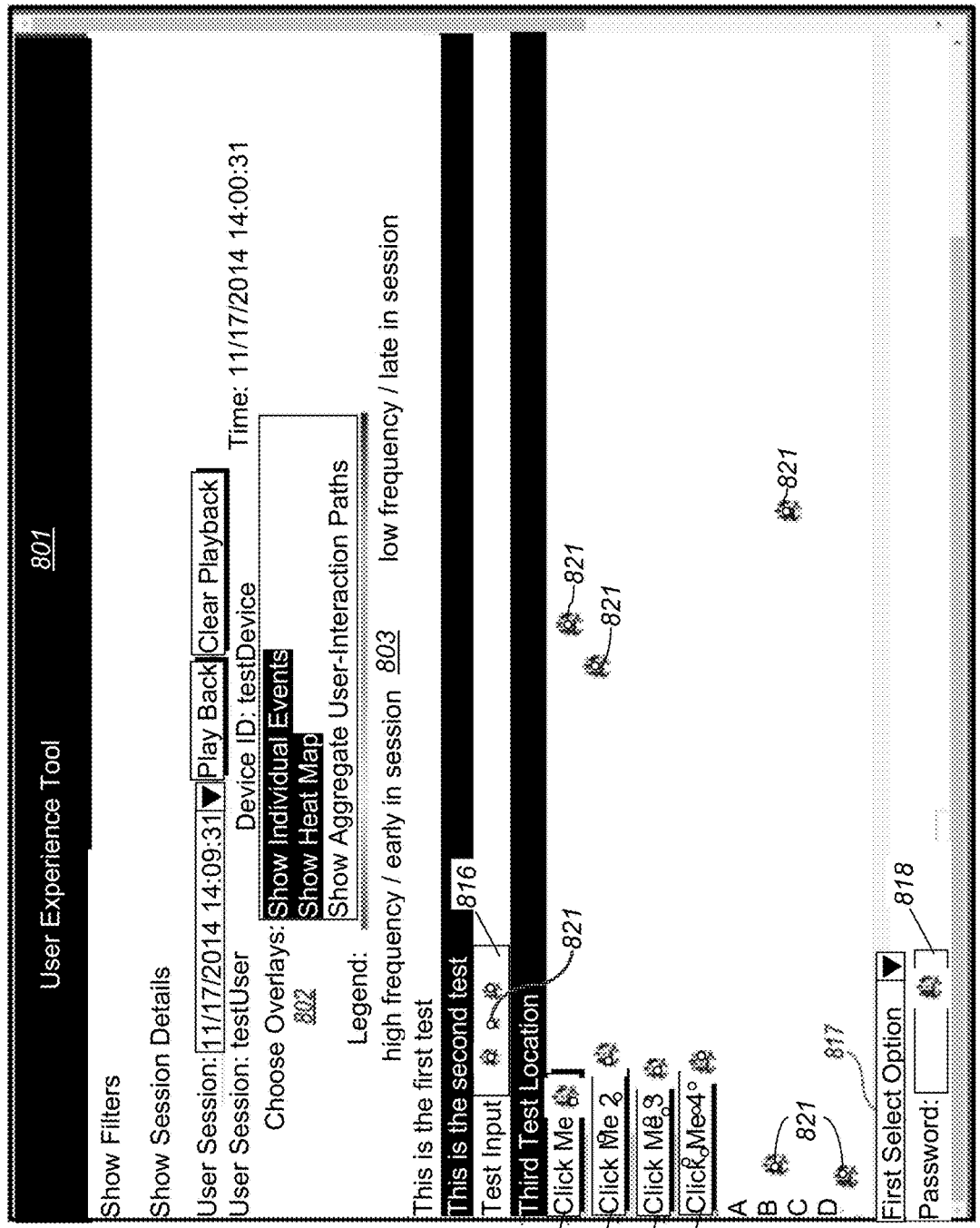

FIG. 8B depicts another view of user experience tool 801. In FIG. 8B, "Show Individual Events" and "Show Heat Map" are selected. Interaction point dots 821 depict interactions with input fields 816 and 818, drop down menu 817, and click boxes 811, 812, 813, and 814. The interaction point dots 821 are presented using the legend 803 (e.g., a red to blue scale, where red indicates high frequency, and blue indicates low frequency).

Figure 8C:
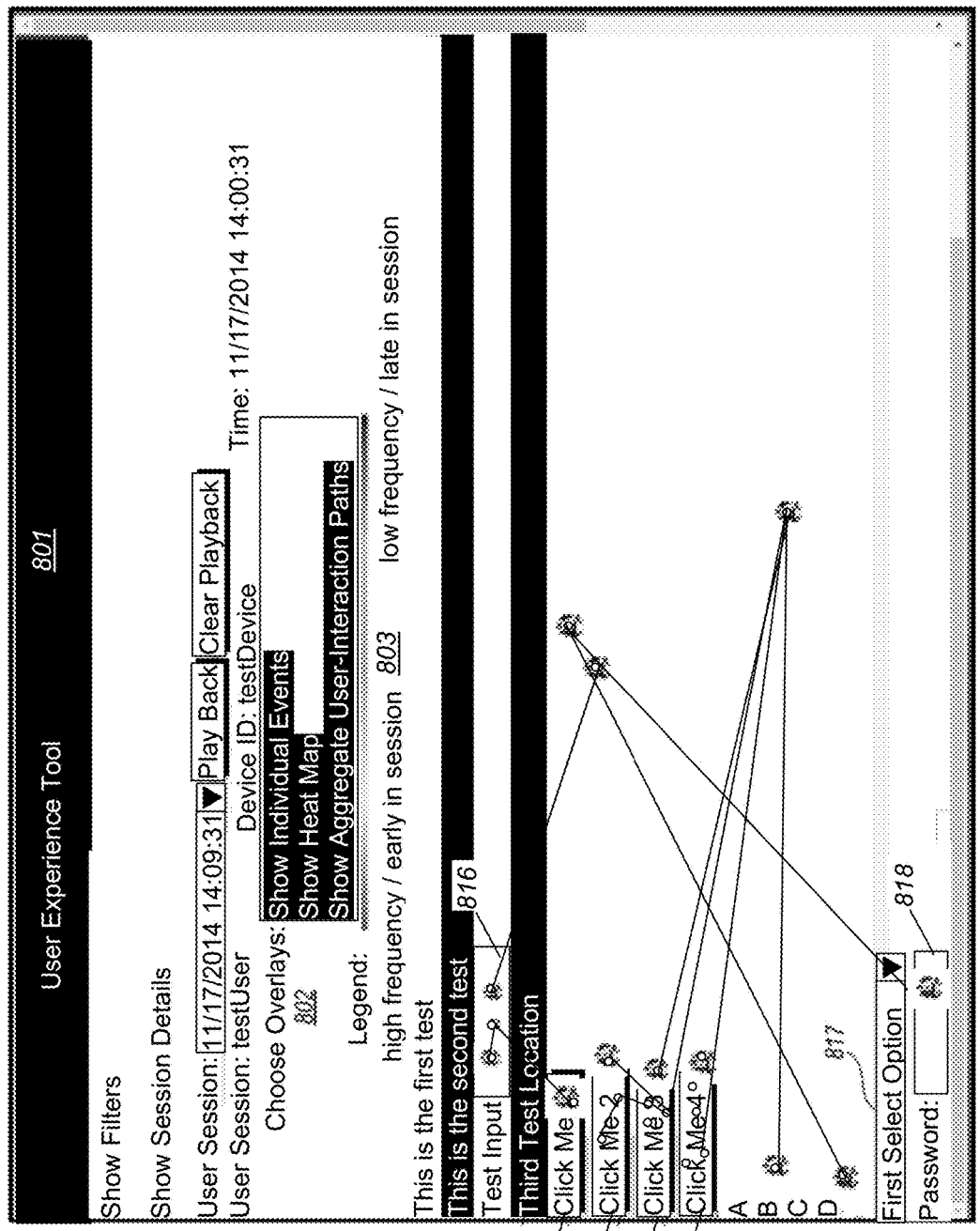

FIG. 8C depicts another view of user experience tool 801. In FIG. 8B, "Show Individual Events", "Show Heat Map", and "Show Aggregate User-Interaction Paths are selected. In addition to interaction points 801, FIG. 8C depicts a set of session path information between locations of the application view, including input fields 816 and 818, drop down menu 817, and click boxes 811, 812, 813, and 814.

Figure 8D:
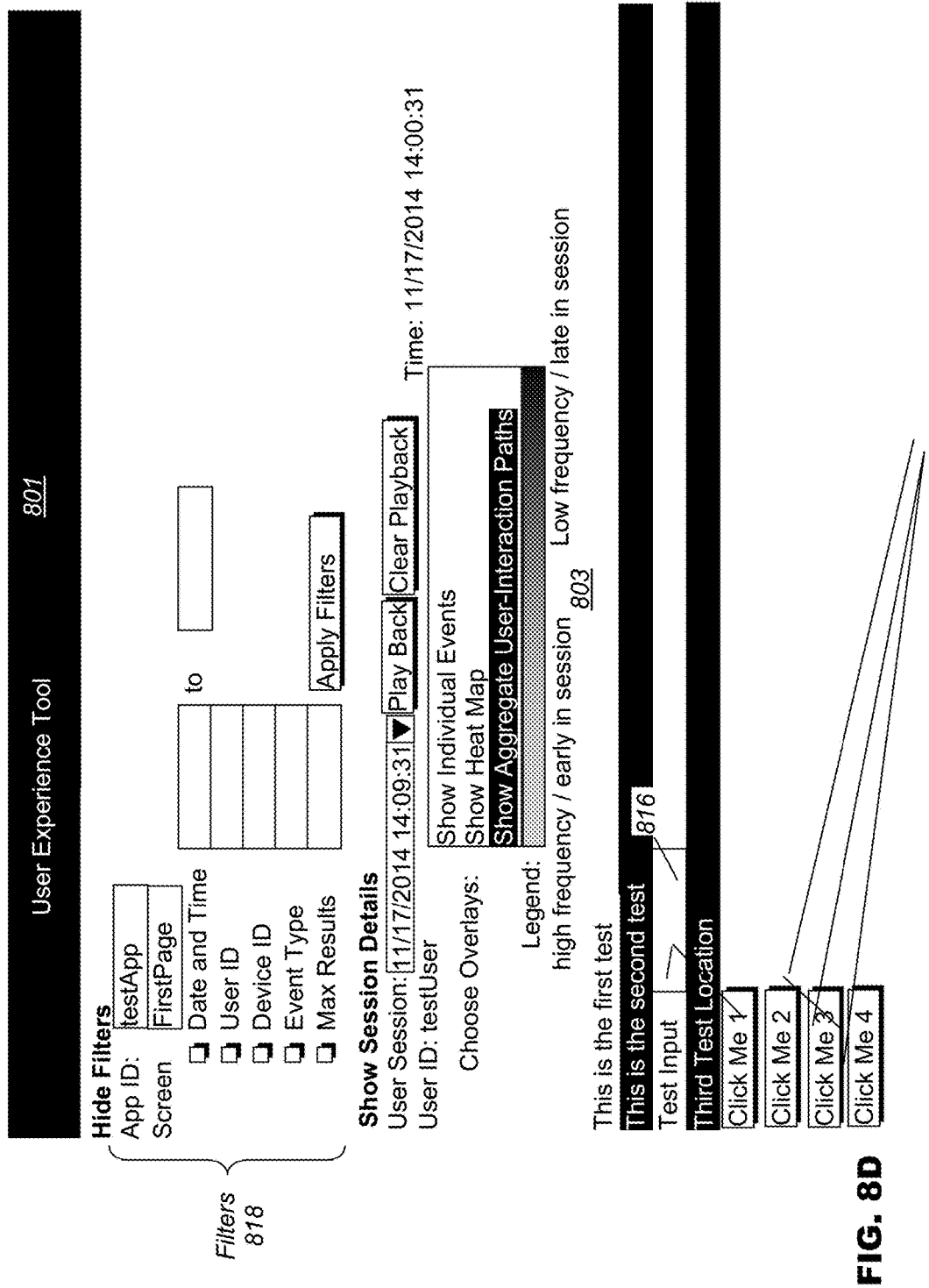

FIG. 8D depicts another view of user experience tool 801. In FIG. 8D, "Show Aggregate User-Interaction Paths" is selected. As such, session path information is depicted but interaction locations and interaction point dots are not depicted. FIG. 8D also depicts filters 831 that can be selected to filter what data is presented in the application view.

Figure 8E:
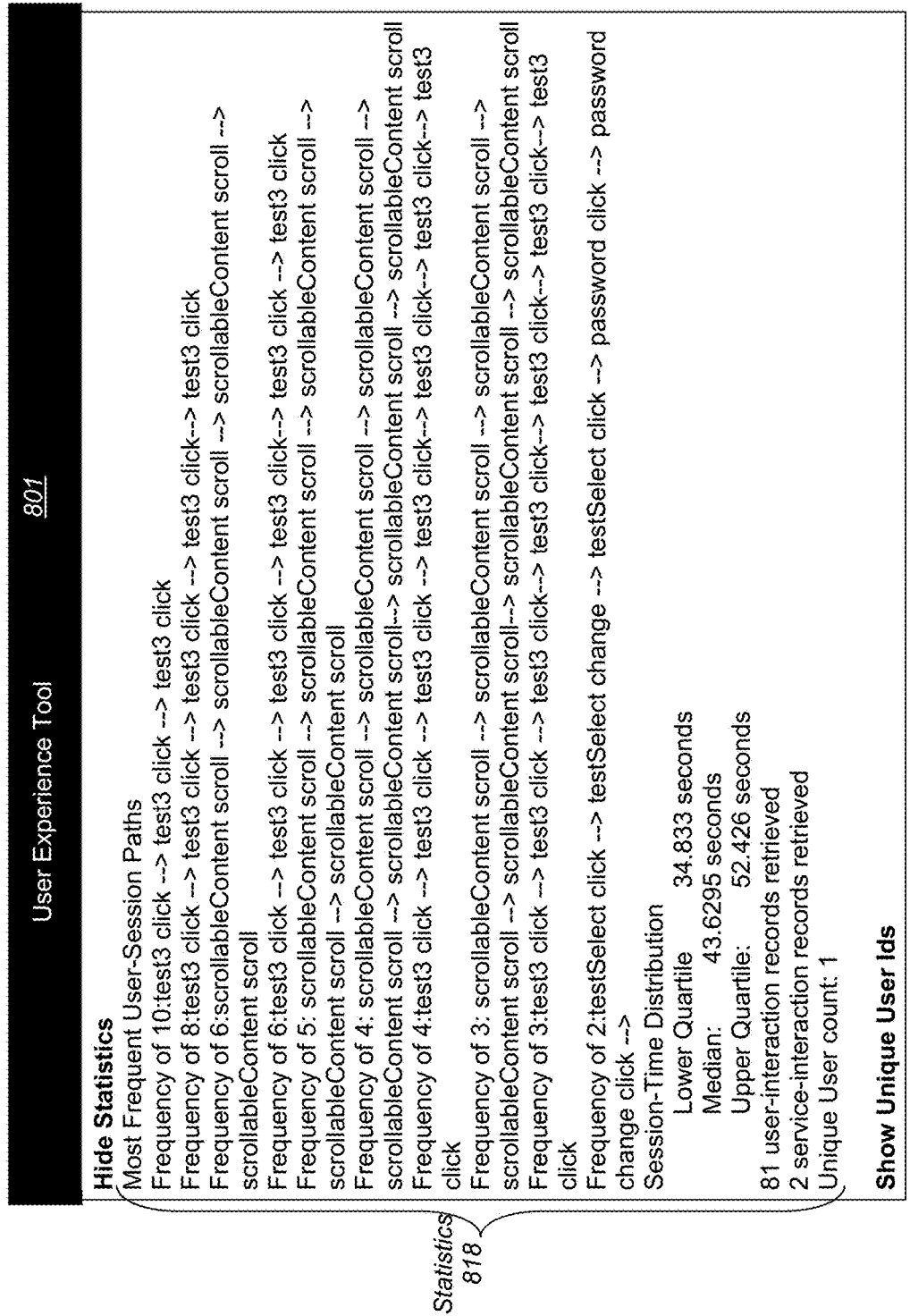

FIG. 8E depicts another view of user experience tool 801. FIG. 8E includes statistical information about user interactions with an application.

Information depicted in FIGS. 8A-8E can enable technical personnel to identify possible improvements for an application that might not otherwise be identified.

Figure 9:
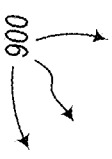
FIG. 9 illustrates a code example of source code to start metrics gathering.

FIG. 9 illustrates a code example of source code 900 to start metrics gathering. Source code example 900 can be included in an application to facilitate metrics gathering when the application is operating. During operation, source code example 900 can cause an application to interoperate with an interaction logger to gather values for data elements of the application.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A processor implemented method for use at computer system, the computer system including a processor, the processor implemented method for presenting a visual representation of user interactions with an application, the processor implemented method comprising:
   receiving a selection of data elements that are to be presented in a heat map for the application, the data elements including: user interactions with a plurality of application elements of the application on a per user interaction and per application element basis, connection information, and device information, the connection information related to characteristics of a network connection used by the application, the device information related to characteristics of a mobile device;
   accessing values for the data elements from a network storage location, the values received from one or more mobile devices, the values gathered during operation of the application at each of the one or more mobile devices in accordance with logging configuration options defining the data elements, the values logged at and transmitted from each of the one or more mobile devices based on resource availability at the mobile device;
   using a heat map generator to form a heat map for the application by representing the user interactions as a visual heat map overlay of the application based on the accessed values, the heat map varying the visual representation of each user interaction based on values for the user interaction, values for connection information associated with the user interaction, and values for device information associated with the user interaction, including, for each user interaction:
      generating, for display in a user experience tool, an overlay simultaneously visually indicating a location of the user interaction and a path between the locations of the user interaction and a subsequent user interaction; and
   displaying in the user experience tool, the heat map with the overlay on an application view as it appeared to a user at the time the user interactions took place.

2. The method of claim 1, wherein the overlay further visually indicates specific interaction points within the application view.

3. The method of claim 2, wherein the specific interaction points are visually indicated using a scale to represent frequency of occurrence.

4. The method of claim 1, wherein each path is visually indicated using a scale to represent frequency of occurrence.

5. The method of claim 1, wherein the application is one of: a mobile application and a web-based application.

* * * * *

UNITED STATES PATENT AND TRADEMARK OFFICE
CERTIFICATE OF CORRECTION

PATENT NO.         : 10,097,430 B2
APPLICATION NO.    : 15/053780
DATED              : October 9, 2018
INVENTOR(S)        : Bartholomew et al.

It is certified that error appears in the above-identified patent and that said Letters Patent is hereby corrected as shown below:

In the Specification

Column 8, Line 57, delete "form" and insert --from--
Column 10, Line 56, delete "basis" and insert --basis,--

Signed and Sealed this
Twenty-sixth Day of March, 2019

Andrei Iancu
*Director of the United States Patent and Trademark Office*